(No Model.)　　　　　　　　　　　　　　　　　　　　　4 Sheets—Sheet 1.
M. G. GRAHAM.
CULTIVATOR.
No. 357,707.　　　　　　　　　　　　　　Patented Feb. 15, 1887.
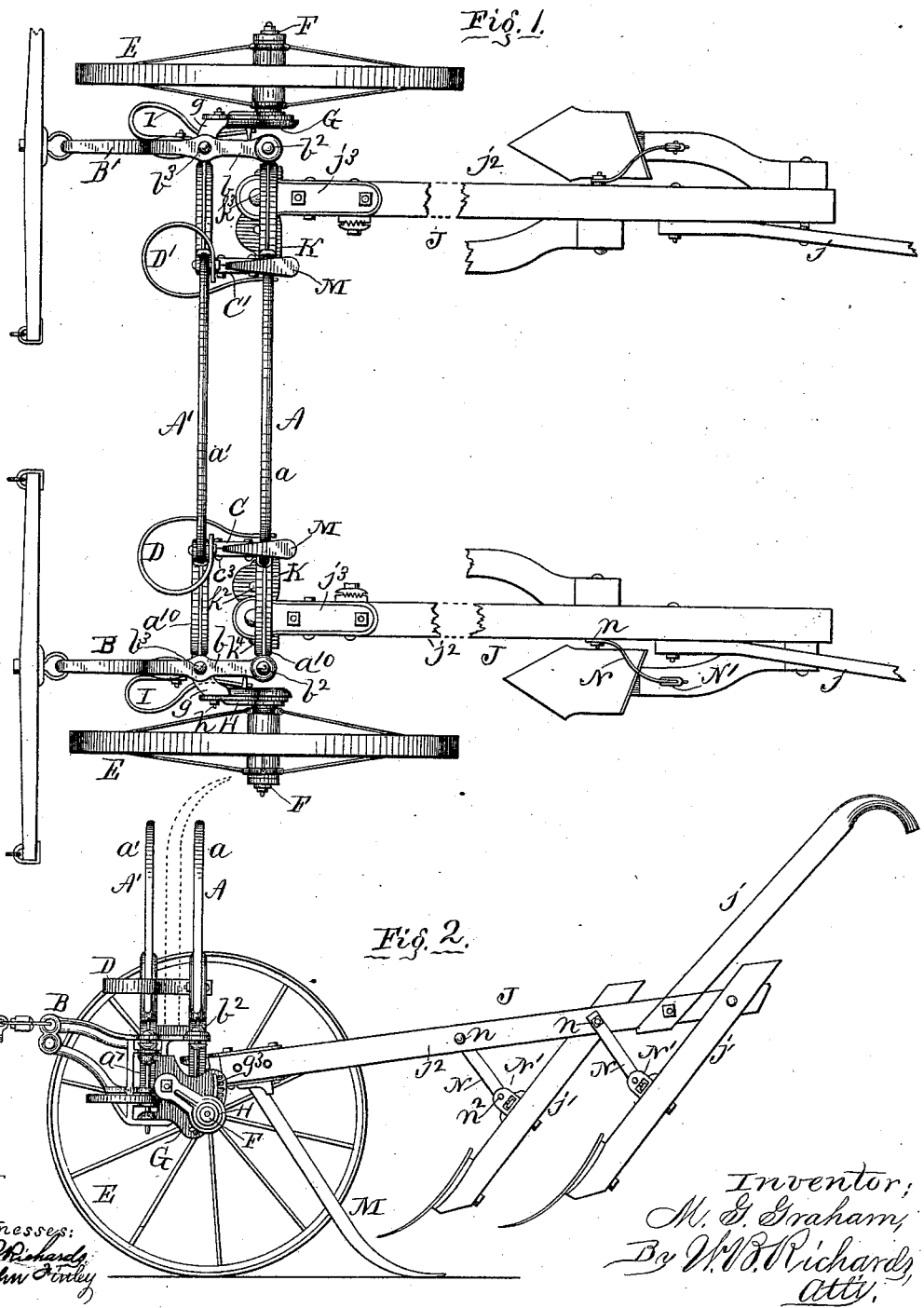

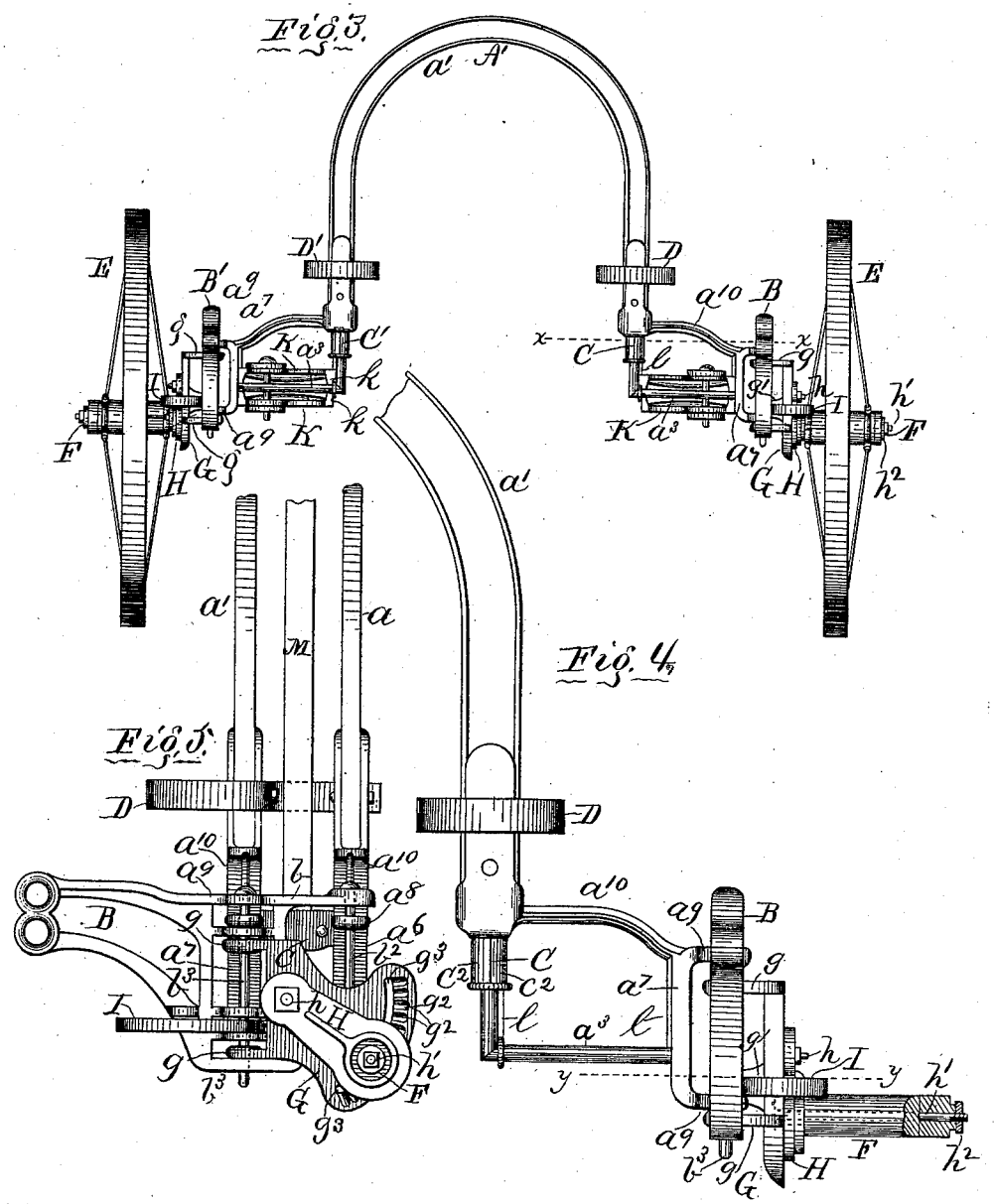

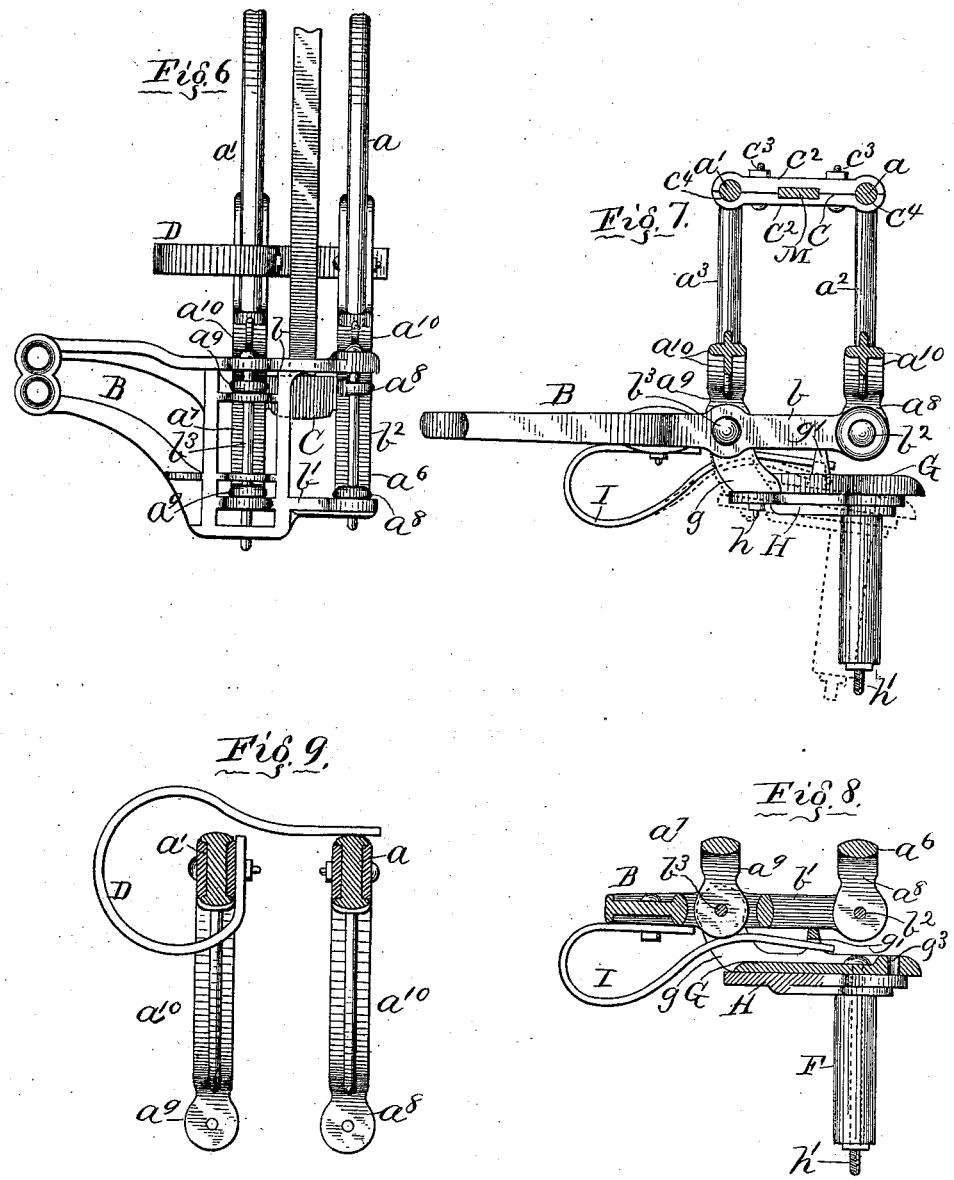

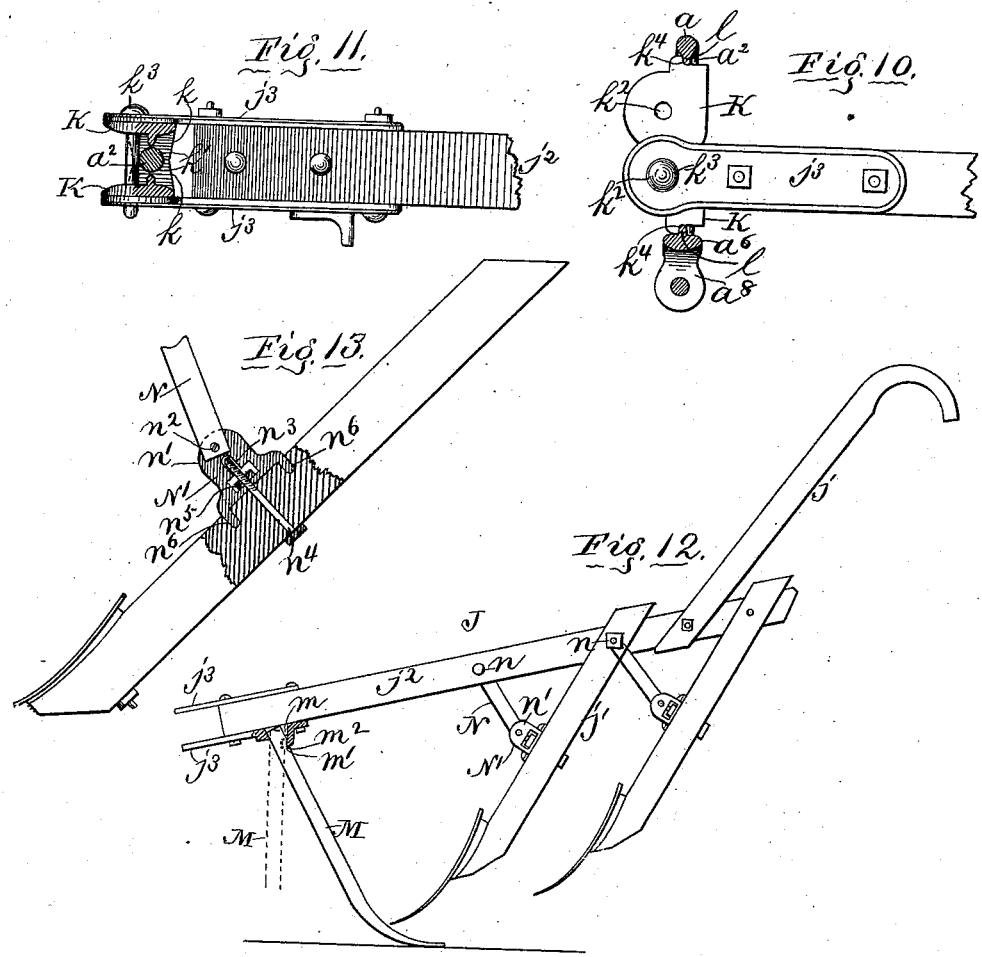

UNITED STATES PATENT OFFICE.

MUCKERSIE G. GRAHAM, OF OTTUMWA, IOWA.

CULTIVATOR.

SPECIFICATION forming part of Letters Patent No. 357,707, dated February 15, 1887.

Application filed December 3, 1886. Serial No. 220,592. (No model.)

*To all whom it may concern:*

Be it known that I, MUCKERSIE G. GRAHAM, a citizen of the United States, residing at Ottumwa, in the county of Wapello and State of Iowa, have invented certain new and useful Improvements in Cultivators, of which the following is a specification.

This invention relates, in its main features, to that class of tongueless or parallel cultivators in which the gangs of plows are hinged to and connected by two yokes having elevated central parts and horizontal or approximately horizontal ends, to which ends the side bars or plates, by which the cultivator is drawn, and which plates carry the stub-axles for the supporting-wheels, are hinged in such manner as to retain the yokes parallel with each other.

The first part of my invention relates to auxiliary couplings near the ends of the yokes, which, while they permit all the usual movements of said yokes, also serve to strengthen them, to hold them in position, and to cause the strain of the draft and the plows to act on both yokes.

The invention further consists in the use of a spring or springs adapted to hold the yokes in proper position for handling the cultivator when the draft-animals are not attached thereto, and when the draft is relaxed, as in turning it at the end of bouts in use, and for other purposes.

A further feature of my invention consists in the use of stub-axles carried on caster-plates hinged to the side draft-plates, substantially as shown in my Patent No. 324,834, dated August 25, 1885, but which, in the combination herein shown and described, have additional functions; and in this connection the invention further consists in the use of a spring adapted to hold the wheel in proper working position, and also in improved means for adjusting the height of the caster-plates relatively to the wheels, for regulating and adjusting the height of the front ends of the plow-gangs.

Further features of my invention relate to combinations and constructions hereinafter described, and set forth in the claims hereto annexed.

In the accompanying drawings, which illustrate one method of embodying my invention in a cultivator, Figure 1 is a top plan; Fig. 2, a side elevation, near wheel removed; Fig. 3, a front elevation; Fig. 4, an enlarged detail, a front elevation of one side of the cultivator; Fig. 5, an enlarged detail, a side elevation of a draft-plate and adjacent parts; Fig. 6, an enlarged detail—an enlarged side elevation of draft-plate and ends of yoke; Fig. 7, an enlarged detail, a sectional plan in line $x\ x$ in Fig. 3; Fig. 8, an enlarged detail, a sectional plan in line $y\ y$ in Fig. 4; Fig. 9, an enlarged detail, a sectional plan of yokes and plan of one of the yoke-springs; Fig. 10, a detail, a plan of the coupling of the plow to the yokes; Fig. 11, a sectional elevation of parts shown at Fig. 10; Fig. 12, an elevation of one plow, the front ends of the plow-beam partly in section to show the socket for runner; Fig. 13, a detail, a sectional elevation of plow-standard where brace is adjustably secured thereto.

Referring to the drawings by letters, the same letter indicating the same part in the different figures and representing the same part in the specification, A A' are the similarly-formed yokes, each having an upwardly-arched central portion, $a\ a'$, respectively, and similar horizontally-projecting end portions, $a^2\ a^3$, respectively. The end parts, $a^2\ a^3$, of the yokes carry similar vertical arms, $a^6\ a^7$, respectively, and the arms $a^6\ a^7$ carry outwardly-projecting ears $a^8\ a^9$, respectively. The arms $a^6\ a^7$ are braced each by a brace-rod, $a^{10}$, which extends to the vertical part of the arch.

The parts hereinbefore described by letters may be formed integral, or partly formed of steel and partly formed of malleable iron, or be otherwise formed, as preferred, and may be otherwise constructed from what I have shown, in order to furnish the necessary working parts, substantially as required, for the functions hereinafter described.

B B' are the side plates or draft-plates, hinged one to each end of the yokes A A', and only one of which need be herein described. Each side plate has arms $b\ b'$ at its rear end, through which pivot-bolts $b^2\ b^3$, respectively, pass, and each bolt $b^2\ b^3$ also passes through the ears $a^8\ a^9$, whereby the side plates are hinged or pivoted to the two yokes in such manner as to permit either end of said yokes to be advanced forward of the other in the manner and for the purposes common in cultivators having twin yokes hinged to side plates, so as to act on the principle of parallel rulers. Each side plate also has its forward end extended and provided with means for attachment of a single-tree or other draft device, for the attachment of one of the draft-animals.

In addition to the hinged connection between the yokes A A', formed by the side plates, B B', they are further hinged to each other by auxiliary hinge-plates C C', one of which is located at or near each end of the arches $a$ $a'$. The hinges C C' are each formed, preferably, of two plates, $C^2$, clamped to each other by bolts $C^3$, and provided with half-round grooves $C^4$ in their adjacent faces, where they receive rounded portions of the arches, on which they can turn. Suitable collars on the arches above and below the hinge-plates C C' will hold them from vertical displacement.

D D' are springs, one of which is attached to each end or vertical part of one of the arches, preferably the front yoke or arch, $a'$, and the spring then so formed that its other end rests, without pressure, against the vertical part of the other yoke or arch when the arches are in their normal positions, as shown at Figs. 1, 2, and 3. These springs will offer a yielding resistance to the movement of either yoke or arch with reference to the other in a direction transversely to the cultivator, and thus hold the arches in their normal positions when handling the plows without the draft-animals, and also in handling them in turning and at other times when the animals are not drawing on the cultivator, thus overcoming one of the greatest objections to the tongueless class of cultivators of that type in which the plow-gangs are connected by a yoke or yokes at their front ends; and while thus operating the resistance of the springs is not so great as to interfere with the operation of the yokes A A' when the cultivator is in use. It will be evident that these springs may be constructed differently from what I have shown, and that they may be secured to the rear arch and act on the outer sides of the front arch, if preferred; hence I do not limit my claim for them to their specific construction nor location.

The supporting-wheels E are mounted on stub-axles F, which stub-axles are indirectly connected to the side plates or draft-plates by caster-plates, which allow each wheel E to swing to a limited extent horizontally in the manner of a caster-wheel, as in my patent hereinbefore referred to. Each caster-plate G has ears $g$ $g$, which enter recesses in a side plate and receive the pivot-bolt $b^3$, on which the caster-plate can swing outwardly at its rear end. The inward swing of the caster-plate at its rear end is limited by a lug, $g'$, thereon coming in contact with the rear portion of side plate, B or B'. The stub-axle F is indirectly connected with the caster-plate G by a plate, H, which is hinged by a bolt, $h$, to the forward part of the plate G in such manner that the rear end of the plate H may be adjusted in a vertical plane on the caster-plate G. The adjacent faces of the plates G and H have serrations $g^2$, as partly shown. The stub-axle projects from the free end of the plate H, and is hollow or tubular. A bolt, $h'$, passes through the tubular stub-axle and through an arc-shaped slot, $g^3$, in the plate G, and has suitable nuts and washers, $h^2$, on its outer end. By loosening the nuts on the bolts $h$ $h'$ the plate H may be adjusted in a higher or lower plane at its rear end, and then held after adjustment by re-tightening same bolts. This adjustment of the plate H provides ready means of adjusting the height of the yokes, and thus adjusting the height of the forward ends of the plow-gangs.

I is a spring, secured to the draft-plate forward of the plate H, curved outwardly and rearwardly from its attachment to the draft-plate, and its rear end passed through a suitable aperture in the lug $g'$. The tension of the spring I is such as to hold the rear end of the caster-plate G with a yielding force toward the draft-plate or side plate, B or B', and thus resist the tendency of the wheel E to turn outwardly with sufficient force to hold it in line while the machine is being handled when the draft-animals are not hitched to the cultivator, or when they are hitched and the cultivator is being turned, backed, or otherwise moved while the draft-animals are not drawing on the cultivator, and at the same time without such force as would interfere with the action of the wheel as a caster when the draft is applied, moving the cultivator forward in use. The springs I are especially useful when the cultivator is being drawn backward by the handles, as they will then hold the wheels from swinging laterally, and thereby interfering with such backward movement. I do not limit my claims for these springs I to their construction as shown, as it will be evident that they may be differently constructed; neither do I limit my claims to the specific arrangement of them as shown, as it will be evident that they may be attached to the caster-plate and act on the side plate or draft-plate, or otherwise arranged to perform the same functions.

It will readily be seen that with the springs D D', holding the arches and draft-plates in their normal positions, and the springs I, holding the caster-wheel plates in their normal positions, the cultivator may be drawn backward by the plow-handles and moved in various ways, both when in use and when not in use, without any of the difficulties attending this class of cultivators as heretofore constructed.

When the cultivator was drawn backward, as constructed under my patent hereinbefore referred to, and the rear sides of the wheels, or either of them, inclined to turn toward the plow-beam, there was nothing to prevent them doing so; but in my present invention when the cultivator is drawn backward the caster-plate strikes the rear part of the draft-plate, which rear part is connected with one end of the rear yoke, which is in turn held by the springs D D', and the wheels thereby held so as to permit of readily moving the cultivator backwardly in curved or straight lines.

J J are ordinary plow-gangs with ordinary handles, $j$, standards $j'$, and plow-beams $j^2$, which are coupled, one to each of the end portions, $a^2$ $a^2$, of the yokes, as follows: Similar plates, K, are placed one above and one below the round portion $a^2$, and each plate K has a flange, $k$, at each of its ends, in which is a groove, $k'$, that rests on the part $a^2$. The upper and lower plates K have series of corresponding holes, $k^2$, forward of the part $a^2$. The beam-plates $j^3$, which are bolted to the plow-beam, extend over and fit against the flat adjacent faces of the plates K, as shown, and have a hole, $j^4$, each in its forward end, through which a bolt, $k^3$, passes, and also passes through either of the holes in the series $k^2$. The plows can thus be set at different distances apart and have lateral swing on the bolt $k^3$, while they have vertical swing by the plates K, turning on the part $a^2$. The upper plate K has a shoulder, $k^4$, on each of its ends, against which ledges or ribs $l$ on the vertical part of the arch $a$ and the vertical arm $a^7$ strike, to prevent the arches falling forward when not in use.

It will be seen that the hinge-plates C C', while permitting all the necessary movements of the yokes, at the same time hold the yokes firmly to each other very near where the plow-gangs are connected with the yokes, and thus cause the force arising from the resistance of the plows when in operation to act about equally on both yokes, and thereby prevent strain or breakage of either, while at the same time facilitating their hinge movement on the side plates or draft-plates by holding the parts in proper alignment with each other.

M M are the runners, which, when in use, are inserted in a socket, $m$, in the lower beam-plate, $j^3$, and are held therein by a transverse groove, $m'$, in their rear sides, resting against a projection, $m^2$, in the rear side of the socket. To remove the runners, the rear ends of the plow-gangs are lifted and the runner turned forward at its lower end, as shown by dotted lines at Fig. 12, to release it from the projection $m^2$, when it may be withdrawn. It is inserted in a similar and evident manner. When the runners are not in use, they may be carried in suitable sockets in the plates C C', as shown by dotted lines at Fig. 2.

The standards $j'$ are braced to the plow-beam by braces N, which are secured to the beam by an ordinary bolt, $n$, and to the standard, as follows: A plate, N', is secured to the front side of the standard, and has jaws $n'$, between which it receives the lower end of the brace N. A wooden break-pin, $n^2$, passes through the jaws $n'$ and the brace N. The plate N' has a hole, $n^3$, into which a bolt, $n^4$, passes after passing through the standard. The plate N' has a recess or aperture, in which a nut, $n^5$, is seated, through which nut the bolt $n^4$ passes. Lugs $n^6$ project from the plate N' into holes in the standard $j'$. A wrench may be used on the head of the bolt $n^4$, to turn it and thereby move the plate N' to or from the standard to lengthen or shorten the brace, and thereby adjust the angle of the standard, as desired.

Having thus described my invention, what I claim as new, and desire to secure by Letters Patent, is—

1. In a cultivator of the class herein described, having twin yokes with horizontal or approximately-horizontal end parts and hinged at or near the outer ends of said horizontal end parts to side plates which carry stub-axles for the wheels, in combination with said yokes and side plates hinged to each other, auxiliary plates connecting the yokes by hinge-connections at or near where the vertical and horizontal parts of the yokes are united, substantially as specified.

2. In a cultivator, in combination, substantially as described, the yokes A A', plates B B', hinged to or near the outer ends of said yokes in a manner to retain the yokes parallel in their successive movements, and plates C C', hinged to the yokes at or near where their vertical parts unite with their horizontal parts.

3. In a cultivator, in combination, substantially as described, the yokes A A', plates B B', hinged to or near the outer ends of said yokes, plates C C', hinged to the yokes at or near where their vertical parts unite with their horizontal parts, and plow-gangs hinged to the horizontal parts of the yokes between the plates B B' and C C'.

4. In a cultivator, in combination, substantially as described, the yokes A A', plates B B', hinged to or near the outer ends of said yokes and provided with stub-axles for the wheels, and plates C C', hinged to the yokes at or near where their vertical parts unite with their horizontal parts.

5. In a cultivator of the class herein described and in combination, substantially as described, the twin yokes hinged to each other at or near their outer ends by side plates which carry stub-axles for the wheels, and springs having one of their ends fixed to one of the yokes and their other ends adapted to act on the other yoke with a yielding force, for the purpose herein set forth.

6. In a cultivator of the class herein described and in combination, as specified, the twin yokes hinged to each other at or near their outer ends by side plates which carry stub-axles for the wheels and by auxiliary plates hinged to the yokes at or near where the vertical parts of the yokes unite with their horizontal parts, and springs having one of their ends fixed to one of the yokes and their other ends adapted to act on the other yoke with a yielding force, for the purpose herein set forth.

7. In a cultivator, in combination, substantially as described, the yokes A A', plates B B', hinged to said yokes, and springs D D', fixed to one yoke and adapted to act on the other, for the purpose specified.

8. In a cultivator, in combination, substantially as described, the yokes A A', plates B B', hinged to said yokes and carrying stub-axles for the wheels, hinge-plates C C', and springs D D', fixed to one yoke and adapted to act on the other, for the purpose specified.

9. In a cultivator, in combination, substantially as described, the yokes A A', plates B B', hinged to said yokes, caster-plates G, hinged at their forward ends to the plates B B', and carrying the stub-axles at their rear ends, and springs I, which hold the caster-plates with a yielding force, for the purpose specified.

10. The caster-plates G, pivoted near their front sides to the side plates, B B', in combination with the stub-axles located in rear of the pivot-bolt $h$, and the springs I, whereby the wheels are permitted to have an independent movement and a limited caster action, controlled by the yielding force of the spring, substantially as described.

11. In a cultivator, in combination, substantially as described, the yokes A A', side plates, B B', hinge-plates C C', springs D D', caster-plates G, hinged at their forward ends to the plates B B,' and provided with stub-axles at their rear ends for the wheels, and the springs I, adapted to hold the caster-plates with a yielding force, for the purposes specified.

12. In a tongueless cultivator, in combination, substantially as described, yokes A A', draft-plates B B', supporting-wheels, plow-beams having beam-plates $j^3$, plates K, having flanges $k$ and grooves $k'$ and holes $k^2$, and the upper plate K, having shoulders $k^3$, adapted to coact with ledges or ribs $l\ l$ on the vertical part of the yokes and on the arm $a^4$.

13. In a cultivator, in combination, substantially as described, with a yoke or yokes, and a side plate or draft-plate hinged to each end thereof, spring-actuated caster-plates hinged at their forward parts to the side plates or draft-plates and provided at their rear parts with stub-axles for the supporting-wheels, for the purpose set forth.

In testimony whereof I affix my signature in presence of two witnesses.

MUCKERSIE G. GRAHAM.

Witnesses.
  O. B. FOLGER,
  GEO. E. BROWN.